Figure 1:
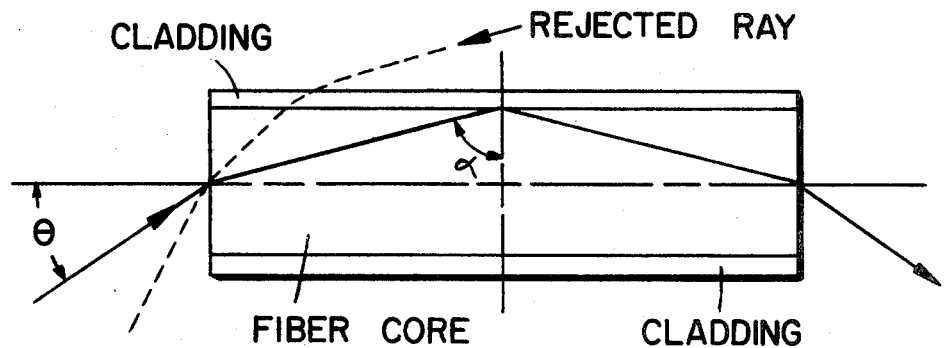

United States Patent
Connelly

[15] 3,650,780
[45] Mar. 21, 1972

[54] FIBER OPTIC CORE GLASS

[72] Inventor: John H. Connelly, Horseheads, N.Y.
[73] Assignee: Corning Glass Works, Corning, N.Y.
[22] Filed: May 1, 1969
[21] Appl. No.: 820,780

[52] U.S. Cl. ....................................... 106/47 Q, 106/50
[51] Int. Cl. ............................... C03c 3/00, C03c 13/00
[58] Field of Search ................................ 106/47 Q, 50

[56] References Cited

UNITED STATES PATENTS

| | | | |
|---|---|---|---|
| 3,006,776 | 10/1961 | Geffcken | 106/47 Q |
| 3,080,240 | 3/1963 | Geffcken et al. | 106/47 Q |
| 2,576,521 | 11/1951 | Kreidl et al. | 106/54 |

FOREIGN PATENTS OR APPLICATIONS 1,287,656  1/1967  France..................106/47 Q Primary Examiner—James E. Poer
Assistant Examiner—M. Bell
Attorney—Clarence R. Patty, Jr. and Clinton S. Janes, Jr.

[57] ABSTRACT

The present invention relates to glass compositions which are eminently suitable for use as core glasses in fiber optic elements. More specifically, the instant invention is concerned with essentially thoria-free glasses in the $La_2O_3$—$B_2O_3$—$Ta_2O_5Nb_2O_5$ composition field exhibiting an index of refraction ($n_D$) higher than about 1.80 and a coefficient of thermal expansion (0°–300° C.) of between about $60$–$70 \times 10^{-7}$/°C.

3 Claims, 2 Drawing Figures

INVENTOR.
John H. Connelly
BY
ATTORNEY

FIBER OPTIC CORE GLASS

Fiber Optics is a rather recently developed branch of optics, although the phenomenon constituting the foundation therefor had been recognized for some time. Thus, fiber optics utilizes the ability to secure total internal reflection whereby light can be transmitted through an optically transparent fiber. A light pipe or fiber element consists of a core glass having a relatively high index of refraction which is enveloped within another glass having a lower refractive index. This composite fiber element traps light within a definite critical angle ($\theta$) and, due to the phenomenon of total internal reflection, transmits the light through the fiber element to the output end thereof where it is emitted at the same angle at which it entered. The light rays will not penetrate through the enveloping or cladding glass inasmuch as the angle of incidence at which the rays strike the walls is greater than the critical angle ($\alpha$) necessary for total reflection. The critical angle of acceptance ($\theta$) and the Numerical Aperture (NA) of the composite fiber element is dependent upon the refractive indices of the core and cladding glasses. Numerical Aperture delineates the maximum acceptance angle at which the fiber element is able to trap and reflect light. Hence, the Numerical Aperture defines the measure of the light gathering ability of a particular fiber element and, when expressed as the sine of the acceptance angle, constitutes a function of the refractive indices of the core and cladding glass materials. Thus, $$NA = n_e \sin \theta = \sqrt{n_1 - n_2}$$

wherein $n_e$ comprises the refractive index of the medium at the entrance of the fiber element (with air this value is 1), $n_1$ represents the refractive index of the core glass, and $n_2$ designates the refractive index of the cladding glass.

FIG. 1 is a diagrammatic sketch pictorially illustrating the above description. Since the practical aspects and theoretical considerations existing in the field of fiber optics have been explored so thoroughly in the literature, further discussion herein is not deemed to be necessary. One excellent study of this area of optics can be found in Appendix N of the book "Concepts of Classical Optics" by John Strong, published in 1958. In any event, this phenomenon of total reflection, complemented with the ready faculty of forming individual composite fiber elements into fiber bundles exhibiting good flexibility where desired, has effected many applications therefor such as cathode ray tube faceplates, image intensifiers, and image dissectors.

In operation, inasmuch as each fiber transmits a single point source of light such that the resolution of the total image is a function of the number of composite fiber elements per unit bundle cross-sectional area, the greater the number of fibers per unit area the better the resolution of the image. However, the resolution of the image can be affected by light rays impinging upon the ends of the cladding glass or by light escaping from the interior of the fiber elements themselves, this latter situation being termed "cross talk" by the art. The building of fiber elements into various configurations has been designated a mosiac construction, i.e., a construction in which fiber elements are grouped and regrouped to build up an area. Such construction commonly results in some degree or type of imperfection at the boundaries of a subgroup. When this boundary condition becomes relatively noticeable, it is called "chicken wire" by the art.

Figure 2:
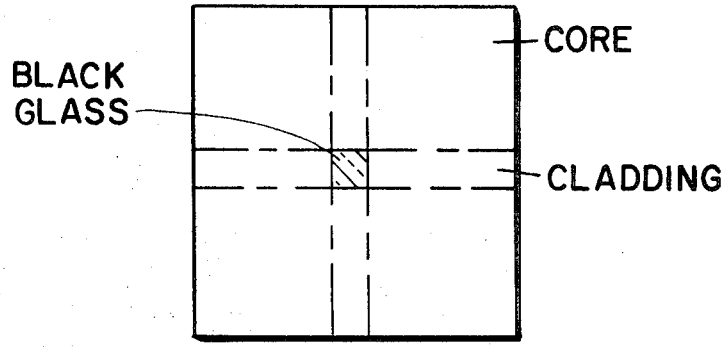

United States patent application Ser. No. 526,395, filed Feb. 10, 1966, and now abandoned, but which issued in Great Britain as Pat. No. 1,113,229 and which is assigned to the same assignee as the present invention, discloses a three-component fiber element comprising a core glass portion exhibiting a high index of refraction, a cladding glass portion demonstrating a lower index of refraction, and a light absorbing glass as a trapping medium for stray light rays. The light absorbing glass is black and consists of an iron-titanium borosilicate composition. Such a three-component element was designed to inhibit cross talk. FIG. 2 is a diagrammatic representation in cross-section of the fiber element of that invention. One method for fabricating such a unit involves stacking four lengths of the high index of refraction core glass having a square cross-section in groups of two in close contiguous relationship. Strips of the lower index of refraction cladding glass having a width equal to a side of the square and a thickness of about one-fourth that of the core are positioned as separators between the four adjacent surfaces of the core lengths. A length of the black glass, also having a square cross-section and sides equal in thickness to that of the cladding strip, is inserted between the stacked core pieces separated by the cladding strips at a point to contact the four strips of cladding and the central point where the inner corners of the four core lengths meet. This composite unit or array is thereafter placed within a glass tube having the same composition as the cladding glass but of a thickness of about one-half that of the cladding strips. Then this assemblage is heated to a temperature sufficiently high to collapse the walls of the tube around the square unit and, subsequently, the assemblage is attenuated to a fiber approximating the shape of the original cross-section by drawing at a temperature approaching the softening point of the core glass, i.e., where the glass has a viscosity of about $10^8$ poises. Where bundles of fibers are desired to build up a mosiac construction, the above-described drawn filament is severed at predetermined lengths, these lengths gathered together and aligned in parallel relation to form another composite unit or array, and thereafter either attenuated again or merely fused together by heating to consolidate to a unitary structure.

An examination of FIG. 1 readily demonstrates that the greater the Numerical Aperture a certain optical fiber element possesses, the larger will be the acceptance angle at which the fiber element can trap and reflect light. Further, inasmuch as NA is dependent upon the relative refractive indices of the core and cladding glasses, it is generally accurate to state that the greater the difference between the refractive indices of the core and cladding glasses, the larger will be the NA and, therefore, the more advantageous will be the final product. Also, the light absorbing capability of the black glass must be very effective even in extremely thin cross-sections. Nevertheless, not only must each of the three components have its above-stated critical property but the coefficients of thermal expansion, the softening points, and the annealing points thereof should be compatible. Finally, for ease of fabrication, the individual glasses ought to be readily melted and formed.

In manufacturing mosiac structures according to British Pat. No. 1,113,229, rods of core glass having a 1 inch square cross-section and a length of 6 inches have been aligned together with separating cladding strips and a rod of the interstitial black glass, as shown in FIG. 2, placed in a glass tube of the cladding glass composition, and then heated and attenuated. The attenuating process is commonly carried out three times to secure individual members of the final bundle of fiber elements which will be very small in cross-section. When a bundle of fibers is fabricated employing three drawing steps followed by a final fusion step to consolidate the individual fiber elements in a bundle of a desired cross-section, the black glass normally has a diameter of about 1 micron and the cross-section of an original fiber unit of 4 core lengths with interstitial spacing cladding and black glass is about 10–25 microns. Such a diameter is greater than the wave lengths of lighting passing therethrough and allows the transmittance of a large number of image sources. It will easily be understood that the area occupied by the cladding glass is wasted and, hence, that area ought to be maintained low, preferably less than 30 percent.

Since the NA is a direct function of the refractive indices of the core and cladding glasses and the greatest practical utility can be enjoyed where the NA is greater than 0.8 and, preferable, 0.9, considerable research has been undertaken to develop glasses with very high indices of refraction, viz., greater than 1.8, which would be chemically and physically compatible with the cladding and black glasses. A reasonably good match of viscosities at the softening points thereof is especially important inasmuch as the fabrication process contemplates a drawing and a fusion step. Finally, the fiber elements should have a coefficient of thermal expansion such as to permit sound seals to be made with alloys such as Ceramvar$^{TM}$, a composite of 27 percent Ni, 25 percent CO, and 48 percent Fe, and Niromet$^{TM}$44, a composite of 44 percent Ni and 56 percent Fe, these alloys being marketed by the Wilbur B. Driver Co.

In the prior art, colorless high index of refraction glasses, i.e., glasses having indices of refraction higher than about 1.80, have contained substantial amounts of thoria ($ThO_2$). However, those glasses cannot be utilized in the present application because of the radiation hazard therefrom and the likelihood of stray electrons activating the phosphor of a photocathode such as forms an integral part of an image intensifier. Therefore, the instant invention demands the essential absence of thoria or any other radioactive material in the glass.

I have discovered that glasses within a well-defined area of the $La_2O_3$—$B_2O_3$—$Ta_2O_5$—$Nb_2O_5$ composition field can be produced which exhibit indices of refraction of at least 1.8, demonstrate coefficients of thermal expansion (0°—300°C. between about 60—70 × $10^{-7}$/°C.), and which can be readily formed and melted. Such glasses fall within the general ranges, by weight on the oxide basis, of about 25—50 percent $La_2O_3$, 15—30 percent $B_2O_3$, 5—30 percent $Ta_2O_5$, and 5—20 percent $Nb_2O_5$, the sum of the $La_2O_3$, $B_2O_3$, $Ta_2O_5$, and $Nb_2O_5$ contents constituting at least 75 percent of the total composition. I have further found that the inclusion of at least 5 percent and up to 15 percent by weight of BaO substantially alleviates the problem of "redraw chickenwire". This phenomenon is believed to be caused by the migration of the coloring ions in the black glass out into the core glass during the attenuating step. I have conjectured that the elimination of this phenomenon can be attributed to the large barium ion blocking the migration of these coloring ions. Table I records several glass compositions, expressed in weight percent on the oxide basis, which are useful in the practice of this invention. The batch ingredients therefor may consist of any materials, either the oxides or other compounds, which, when melted together, will be converted to the desired oxides in the proper proportions. The batches were melted in platinum crucibles for 2 hours at 1350°C., the melts being mechanically stirred to improve homogeneity. The melts were then cast into heated carbon molds to yield blocks about 3 inch × 1 inch × 1 inch and the blocks thereafter transferred to an annealer operating at 620°C. Table I also records the softening points, annealing points, strain points, densities, coefficients of thermal expansion (measured between 0°–300°C.), and indices of refraction determined on the glasses by conventional techniques.

As was explained in British Pat. No. 1,113,229 the presence of alkali metals, particularly $Na_2O$, tends to decolorize the black glass. Therefore, where a three component unit utilizing the black glass of British Pat. No. 1,113,229 is to be employed, the $Na_2O$ content of these high index glasses is preferably held below 2.5 percent by weight. In any case, alkali oxide contents totaling more than about 3 percent by weight should be avoided since these can act to soften the glass, lower the index of refraction and/or raise the coefficient of thermal expansion. Additions of up to 10 percent by weight of $Al_2O_3$ and/or $ZrO_2$ are useful in widening the glass-forming composition area and improving the chemical durability of the basic four-component system and the inclusion of up to 10 percent by weight ZnO softens the glass (lowers the softening and melting points) while increasing the index of refraction thereof. Finally, the addition of up to 3 percent by weight $As_2O_5$ has been found to be especially effective as a melting aid.

My preferred compositions utilize the six component system $La_2O_3$—$B_2O_3$—$Ta_2O_5$—$Nb_2O_5$—BaO—$Al_2O_3$ wherein the $La_2O_3$ + BaO contents total 30–50 percent by weight, the $B_2O_3$ + $Al_2O_3$ contents total 20–30 percent by weight, and the $Ta_2O_5$ + $Nb_2O_5$ contents total 20–35 percent readily melted and formed glasses with indices of refraction considerably higher than 1.8 and with substantially minimized "chickenwire" effect.

Various other compatible metal oxides may be included but the total of such additions should not exceed about 10 percent by weight. Hence, $SiO_2$, MgO, CaO, SrO, and CdO may be present in amounts up to 5 percent by weight. Melting aids such as $P_2O_5$ and F tend to soften the glass excessively and lower the index of refraction so are preferably utilized in amounts less than 2 percent by weight. Lead and bismuth are preferably absent from the glass but can be tolerated in amounts less than 1 percent by weight. The overall effect resulting from these miscellaneous additions is to hazard the stability of the glass, i.e., chance the devitrification thereof, as well as to modify the coefficient of thermal expansion and the index of refraction.

TABLE I

|  | 1 | 2 | 3 | 4 | 5 |
|---|---|---|---|---|---|
| $La_2O_3$ | 30% | 30% | 32.0% | 50% | 50% |
| $B_2O_3$ | 20 | 20 | 22.1 | 25 | 25 |
| $Ta_2O_5$ | 10 | 18 | 8.9 | 15 | 10 |
| $Nb_2O_5$ | 15 | 10 | 15.5 | 10 | 10 |
| $Al_2O_3$ | 8 | 5 | 2.6 | — | 5 |
| $ZrO_2$ | 7 | 7 | 8.9 | — | — |
| BaO | 10 | 10 | 5.0 | — | — |
| ZnO | — | — | 5.0 | — | — |
| Softening Point | 732° C. | 722° C. | 716° C. | 732° C. | 728° C. |
| Annealing Point | 646° C. | 640° C. | 632° C. | 659° C. | 649° C. |
| Strain Point | 621° C. | 617° C. | 608° C. | 642° C. | 626° C. |
| Exp. (×$10^{-7}$/°C.) | 67.4 | 66.6 | 66.0 | 67.3 | 68.6 |
| Density (g./cm.$^3$) | 4.447 | 4.340 | 4.594 | 4.675 | 4.47 |
| $n_D$ | 1.81 | 1.83 | 1.80 | 1.84 | 1.81 |
|  | 6 | 7 | 8 | 9 | 10 |
| $La_2O_3$ | 40% | 40% | 40% | 40% | 30% |
| $B_2O_3$ | 25 | 25 | 20 | 20 | 20 |
| $Ta_2O_5$ | 10 | 20 | 20 | 20 | 10 |
| $Nb_2O_5$ | 20 | 10 | 10 | 10 | 15 |
| $Al_2O_3$ | 5 | 5 | — | — | 8 |
| $ZrO_2$ | — | — | — | 10 | 7 |
| BaO | — | — | — | — | 10 |
| ZnO | — | — | 10 | — | — |
| $As_2O_5$ | — | — | — | — | 2 |
| Softening Point | 722° C. | 733° C. | 698° C. | 746° C. | 733° C. |
| Annealing Point | 640° C. | 652° C. | 615° C. | 669° C. | 643° C. |
| Strain Point | 614° C. | 628° C. | 591° C. | 648° C. | 619° C. |
| Exp. (×$10^{-7}$/°C.) | 62.5 | 61.4 | 67.7 | 65.2 | 66.6 |
| Density (g./cm.$^3$) | 4.28 | 4.44 | 4.96 | 4.86 | 4.426 |
| $n_D$ | 1.84 | 1.81 | 1.875 | 1.81 | 1.81 |

In the above Table I, there can be seen 10 examples of an essentially $ThO_2$-free glass having an index of refraction of at least 1.8 and a coefficient of thermal expansion (0°–300°C.) between 60–70 × $10^{-7}$°C. consisting essentially, by weight on the oxide basis, of about 30–50 percent $La_2O_3$, 20–25 percent $B_2O_3$, 8.9–20 percent $Ta_2O_5$, and 10–20 percent $Nb_2O_5$.

The cladding glasses may comprise essentially any glass capable of being made in optical quality and having a low index of refraction. Hence, potash lime glasses, potassium aluminosilicate glasses, lithium borosilicate glasses, potassium borosilicate glasses, and alkali-free glasses of various compositions are quite suitable. Here again, $Na_2O$ is preferably absent from the glass since it deleteriously decolorizes the black glass. Nevertheless, it must be re-emphasized that in fabricating combinations of core and cladding glasses the other physical properties thereof need to be considered, e.g., the softening points, the annealing points the strain points, the coefficients of thermal expansion, and, particularly, the viscosities of the glasses at their respective softening points since the process entails a drawing and a fusion step.

Table II records two useful cladding glass compositions expressed in weight percent on the oxide basis. These glasses have expansion coefficients slightly lower than the core glasses of the present invention. This factor improves the process of drawing and enhances the strength of the composite fiber element inasmuch as the cladding glass acts as a surface compression layer. A combination of either of these two glasses with Examples in Table I will yield an NA of about 1.0.

TABLE II

|  | 11 | 12 |
| --- | --- | --- |
| $SiO_2$ | 65.5% | 69.4% |
| $B_2O_3$ | 15.3 | 18.0 |
| $Al_2O_3$ | 9.0 | 3.0 |
| $Na_2O$ | 2.1 | 0.5 |
| $K_2O$ | 4.0 | 8.3 |
| $Li_2O$ | 1.1 | 0.8 |
| BaO | 3.0 | — |
| Softening Point | 708° C. | 718° C. |
| Annealing Point | 475° C. | 513° C. |
| Strain Point | 438° C. | 473° C. |
| Exp. ($\times 10^{-7}/°C.$) | 46 | 51 |
| Density (g./cm.³) | 2.28 | 2.28 |
| $n_D$ | 1.484 | 1.487 |

The light absorbing black glasses utilized to inhibit "cross talk" are those recited in British Pat. No. 1,113,229. Such glasses are essentially borosilicate compositions containing about 2–10 percent by weight $Fe_2O_3$ and 2–10 percent by weight $TiO_2$, the sum of these two components totaling about 4–15 percent by weight. The glasses are substantially free from the divalent transition metal oxides and include less than 5 percent by weight of the alkaline earth metal oxides. In general, these glasses contain 8–30 percent by weight $B_2O_3$ and more than 30 percent by weight $SiO_2$. Table III recites three such glasses, expressed in weight percent on the oxide basis, which are useful in fabricating three component fiber elements employing the core glasses of the instant invention.

TABLE III

|  | 13 | 14 | 15 |
| --- | --- | --- | --- |
| $SiO_2$ | 60.7% | 53.2% | 60.9% |
| $Al_2O_3$ | 2.8 | 2.9 | 2.8 |
| $B_2O_3$ | 17.2 | 17.7 | 17.2 |
| $Na_2O$ | 0.4 | — | 8.1 |
| $K_2O$ | 7.9 | 15.1 | — |
| $Fe_2O_3$ | 8.1 | 8.2 | 8.1 |
| $TiO_2$ | 2.7 | 2.7 | 2.7 |
| $As_2O_3$ | 0.2 | 0.2 | 0.2 |
| Softening Point | 752° C. | 700° C. | 670° C. |
| Annealing Point | 497° C. | 509° C. | 504° C. |
| Exp. ($\times 10^{-7}/°C.$) | 48 | 71 | 56 |
| $n_D$ | Opaque | Opaque | Opaque |

Inasmuch as the mass of the black glass within the composite fiber unit is so small, a substantial mismatch in coefficients of thermal expansion between it and the core and/or cladding glasses can be tolerated whether it is used to coat individual cladded core glass elements or positioned interstitially to the cladding and core glasses. Nevertheless, it is better glass technology to employ a black glass having a coefficient of thermal expansion closely approximating those of the cladding and core glasses. The black glasses set out in Table III retain their opacity in thicknesses less than 10 microns such that they are eminently suitable for absorbing unwanted stray light.

The present invention, founded upon the above-described core glass compositions, provides a $ThO_2$-free three-component fiber optic element having improved resolution when compared with the product of British Pat. No. 1,113,229 and which is essentially free from the "redraw chickenwire" effect.

I claim:

1. An essentially $ThO_2$-free glass having an index of refraction of at least 1.8 and a coefficient of thermal expansion (0°–300°C.) between 60–70 $\times$ $10^{-7}$°C. consisting essentially, by weight on the oxide basis, of about 30–50 percent $La_2O_3$, 20–25 percent $B_2O_3$, 8.9–20 percent $Ta_2O_5$, and 10–20 percent $Nb_2O_5$.

2. A glass according to claim 1 which also contains, by weight, 0–10 percent $Al_2O_3$, 0–10 percent $ZrO_2$, 0–15 percent BaO, 0–10 percent ZnO, and 0–3 percent $As_2O_5$.

3. A glass according to claim 2 wherein the sum of $La_2O_3$ + BaO ranges between 30–50 percent, the sum of $B_2O_3$ + $Al_2O_3$ ranges between 20–30 percent, and the sum of $Ta_2O_5$ + $Nb_2O_5$ ranges between 20–35 percent.

* * * * *

UNITED STATES PATENT OFFICE
CERTIFICATE OF CORRECTION

Patent No. 3,650,780　　　　　　　　　　Dated March 21, 1972

Inventor(s) John H. Connelly

It is certified that error appears in the above-identified patent and that said Letters Patent are hereby corrected as shown below:

Column 3, line 73, after "percent" insert -- by weight. Within those prescribed ranges can be obtained --.

Signed and sealed this 1st day of August 1972.

(SEAL)
Attest:

EDWARD M. FLETCHER, JR.　　　　ROBERT GOTTSCHALK
Attesting Officer　　　　　　　　Commissioner of Patents